OR 3,015,087

Dec. 26, 1961 W. F. O'GORMAN 3,015,087

SECURITY SYSTEM

Filed July 26, 1955 10 Sheets-Sheet 1

INVENTOR.
WILLIAM F. O'GORMAN

BY James and Franklin

ATTORNEYS

INVENTOR.
WILLIAM F. O'GORMAN.

BY James and Franklin

ATTORNEYS

INVENTOR.
WILLIAM F. O'GORMAN.
BY James and Franklin
ATTORNEYS

INVENTOR.
WILLIAM F. O'GORMAN
BY James and Franklin
ATTORNEYS

Dec. 26, 1961 W. F. O'GORMAN 3,015,087

SECURITY SYSTEM

Filed July 26, 1955 10 Sheets-Sheet 5

INVENTOR.
WILLIAM F. O'GORMAN
BY James and Franklin
ATTORNEYS

SECURITY SYSTEM

Filed July 26, 1955

INVENTOR.
WILLIAM F. O'GORMAN.

BY James and Franklin
ATTORNEYS

INVENTOR.
WILLIAM F. O'GORMAN.
BY James and Franklin
ATTORNEYS

INVENTOR.
WILLIAM F. O'GORMAN.
BY James and Franklin
ATTORNEYS.

INVENTOR.
WILLIAM F. O'GORMAN
BY James and Franklin
ATTORNEYS

INVENTOR.
WILLIAM F. O'GORMAN.
BY James and Franklin
ATTORNEYS 3,015,087
Patented Dec. 26, 1961

3,015,087

SECURITY SYSTEM

William F. O'Gorman, New York, N.Y., assignor to Security Systems, Inc., New York, N.Y., a corporation of New York Filed July 26, 1955, Ser. No. 524,320
32 Claims. (Cl. 340—149)

This invention relates to security systems, and more particularly to a pass card system for controlling entrance to a manufacturing plant or laboratory or other place to be protected.

The primary object of the present invention is to generally improve security systems or pass card systems for the specified purpose. A more specific object is to provide a pass card (hereinafter more briefly called a "pass") having concealed therein a material adapted to be impressed electronically with an invisible, normally-retained but erasable code characteristic. The entrance to the plant is provided with a "detector" to which the pass is presented in order to check whether it has the proper code characteristic, and in accordance with further features and objects of the invention, appropriate alarm means or/and a barrier such as a gate or turnstile, may be provided, all under control of the detector.

A further object of the invention is to make the code characteristic readily changeable, and to change it from time to time. Indeed the plant gate preferably is provided with a "validator" to which the pass is presented when leaving the plant, and this impresses the pass with a code characteristic needed for entrance to the plant the next day. To facilitate changing the validator and detector from time to time, perhaps daily, I provide a remote control which may be located and safeguarded in a security office either within or remote from the plant, and this may be used to change the adjustment of the validator or/and detector whenever desired. However, it is not necessary to use remote control, and the changes may be made manually at the detector and validater.

A plant having multiple gates may be provided with a validator and a detector at each gate, and all may be adjusted alike under control of a remote control means. However, if different personnel are to be restricted to different gates, the detector and validator at one gate may be adjusted differently from that at another. Here again the adjustment may be under remote control, but by means of a plurality of controls.

A further object of the invention is to erase the code characteristic from the pass each time it has been presented to the detector. Thus the pass is devoid of any code characteristic until validated for the next day on leaving the plant.

To accomplish the foregoing general objects, and other more specific objects which will hereinafter appear, my invention resides in the security system elements, and their relation one to another, as are hereinafter more particularly described in the following specification. The specification is accompanied by drawings, in which.

Figures 4, 5:
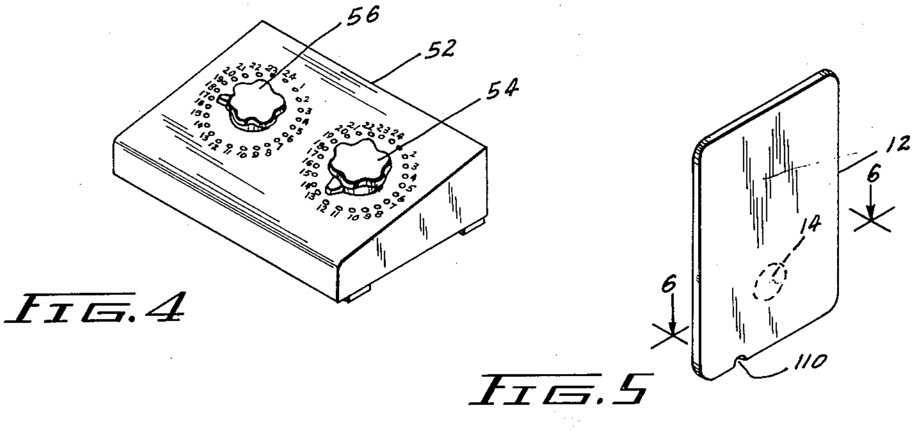
FIG. 4 is a perspective view of a remote control unit for setting the detector and the validator.
FIG. 5 is a perspective view of a pass.
Figure 6:
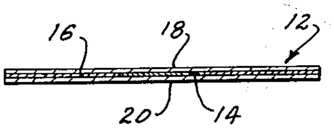
FIG. 6 is a section through the pass.

Referring to the drawing, and more particularly to FIGS. 5 and 6, the pass 12 carries a material 14 which is adapted to be impressed electronically with an erasable code characteristic. The material 14 is preferably, though not necessarily, concealed within the pass. In the present case the material 14 is a magnetic material, and more specifically it is a thin disc of a highly magnetic substance (for example, "Alnico #2") which disc is adapted to be magnetized diametrically at any desired angle.

In FIG. 6 it will be seen how the disc 14 may be received in a mating hole in a layer of material 16 which is laminated between side layers 18 and 20, so that the pass is of uniform thickness. The pass may carry customary information, including some or all of photograph, name, signature, fingerprint, etc., as is usual with security systems in which the pass does not carry the concealed material 14. The pass may be sheathed in transparent plastic, as is often done with ordinary passes.

Figure 2:
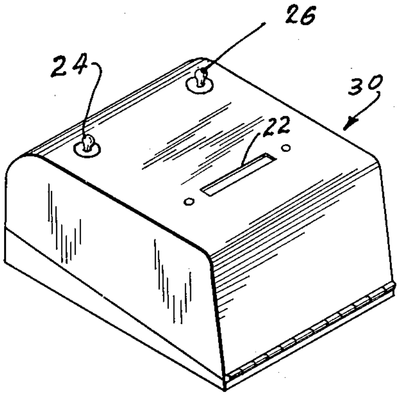
FIG. 2 is a perspective view of a detector used at an entrance.

FIG. 2 shows a detector unit, and this is provided with a slot 22 dimensioned to receive the pass. The pass is inserted by an employee on his way into the plant, and the detector automatically distinguishes between a proper and an improper pass. It may signify whether it is satisfied or not, in any desired fashion, as by the provision of lamps 24 and 26 which may be of different color. Typically, a green lamp may be lighted for a proper pass, and a red lamp for an improper pass. At the same time an audible alarm may sound, and the detector may also control a barrier.

Figure 1:
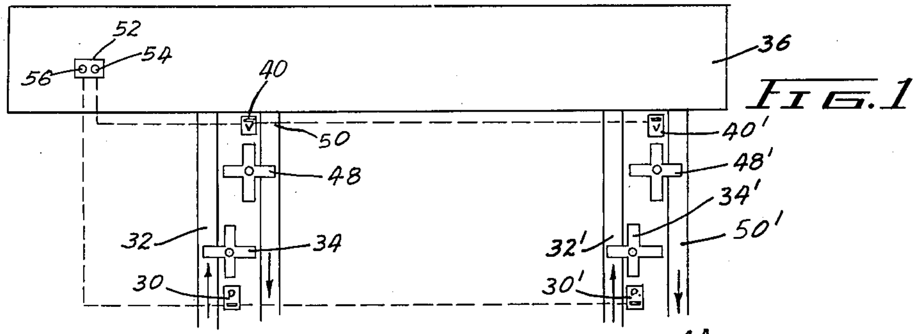
FIG. 1 is a plan view explanatory of one arrangement of the security system elements.

Thus referring to FIG. 1, the detector 30 is disposed adjacent an entrance path 32 blocked by a turnstile 34 leading into a plant or laboratory 36. A person seeking entry must present his pass to the detector 30, which releases the turnstile 34 in the event that the pass is proper.

The code characteristic in the pass preferably is erasable, and the detector may itself be arranged to erase the code characteristic as the pass is withdrawn therefrom. Thus a person in the plant has a blank pass. On leaving the plant he presents the pass to a validator, indicated at 40 in FIG. 3. In exterior appearance this may resemble the detector, and it has a slot 42 to receive the pass. While in the validator the pass is impressed with a code characteristic which may and usually does differ from that which was on the pass during preceding entry. The new code characteristic is one which will be required to satisfy the detector when a person enters the plant the next day. The validator may be provided with means to help insure that the pass has been successfully impressed with a code characteristic, failing which a red lamp 44 may light instead of a green lamp 46 (or neither may light), and an exit turnstile 48 (FIG. 1) may fail to release, thus warning the holder of the pass that it has not been properly validated for his next admission. An attendant or guard is put on notice, for the person may be a trespasser holding a pass which cannot be validated.

In FIG. 1 the exit path 50 is separate from the entrance path 32, but it will be understood that this is not essential, and that a detector and validator may be provided at a single path, one being used on the way in, and the other on the way out.

The adjustment or setting of the detector and validator may be accomplished remotely, and in FIG. 1 a remote control unit 52 is shown inside the plant, this having a control 56 for the detector and a control 54 for the validator. A control unit is shown in FIG. 4, and in the present case consists merely of a rotatable dial for each control. Reverting to FIG. 1, the plant may have multiple gates, and in such case the detectors and validators may be set alike. Thus the detector 30′ for entrance 32′ may be connected to and set simultaneously with the detector 30, and the validator 40′ for exit 50′ may be connected to and set simultaneously with the validator 40. However, this is not essential, and it is evident that by providing separate control units like the unit 52, the different gates may be set differently, thus requiring certain personnel to use one gate and others to use another.

*The validator*

The validator may be described with reference to FIGS. 7 through 13. The pass is slid downward into the slot 42 (FIG. 7) previously mentioned. It is then disposed immediately adjacent a main magnet 60, which is carried on a rotatable disc 62. The magnet is an electromagnet, and is energized by coils 64 (FIGS. 8 and 10) disposed on the legs of the magnet core. These are joined by a transverse bar 66, and it is this part of the generally U-shaped magnet which may be secured to disc 62, as by means of the screws 68 in FIG. 9, which shows the back of disc 62. In FIGS. 8 and 10 it will be seen that the poles of the magnet converge, and are narrowed to present slender radial pole faces, and these are so located as to be diametrical of the magnetic disc concealed in the pass. When the pass is inserted and the magnet energized, the pass is magnetized at an angle determined by the angular disposition of the rotatably mounted magnet.

That is determined under remote control by a system which in the present case includes a rotary solenoid 70. This forms a part of a twenty-four position system of a type made by G. H. Leland, Inc. of Dayton, Ohio, under the trade mark "Ledex." The shaft of the rotary solenoid oscillates once when the solenoid is energized, it being moved back by a return spring when the solenoid is de-energized. The shaft is connected through a suitable floating ratchet system at 72, to a shaft 74 which passes through and operates several wafer switches, here generally designated 76. The shaft then passes through a suitable bearing plate 78, to the disc 62 previously mentioned. With twenty-four positions the step angle is 15°, and the solenoid movement may be from 16° to 29°, the excess being taken up in lost motion in the pawl and ratchet at 72.

Figure 9:
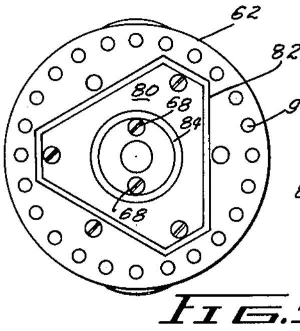
FIG. 9 is an elevation of one side of the detent disc and magnet of the validator, looking in the direction of the arrows 9—9 of FIG. 7.
Figure 10:
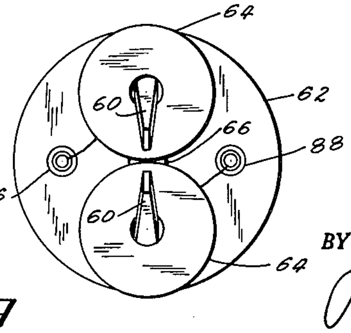
FIG. 10 is an elevation of the same parts looking in opposite directions.

Referring now to FIG. 9, the disc 62 is preferably made of insulation, and carries metal plates 80 and 82 which are separated electrically, as by means of the six-sided gap at the numeral 81. The inner plate 80 is insulated from the shaft by a circular gap 84. Plate 80 is connected to one terminal of the electromagnet coils 64, as indicated at 86 in FIG. 10, and plate 82 is connected to the other terminal, as indicated at 88 in FIG. 10. The plate 82 acts also as a detent disc, and for this purpose is provided with a circle of twenty-four holes, indicated at 90 in FIG. 9. The plates 80 and 82 are secured to the insulation disc 62, as by means of three screws each shown in FIG. 9.

Figure 7:
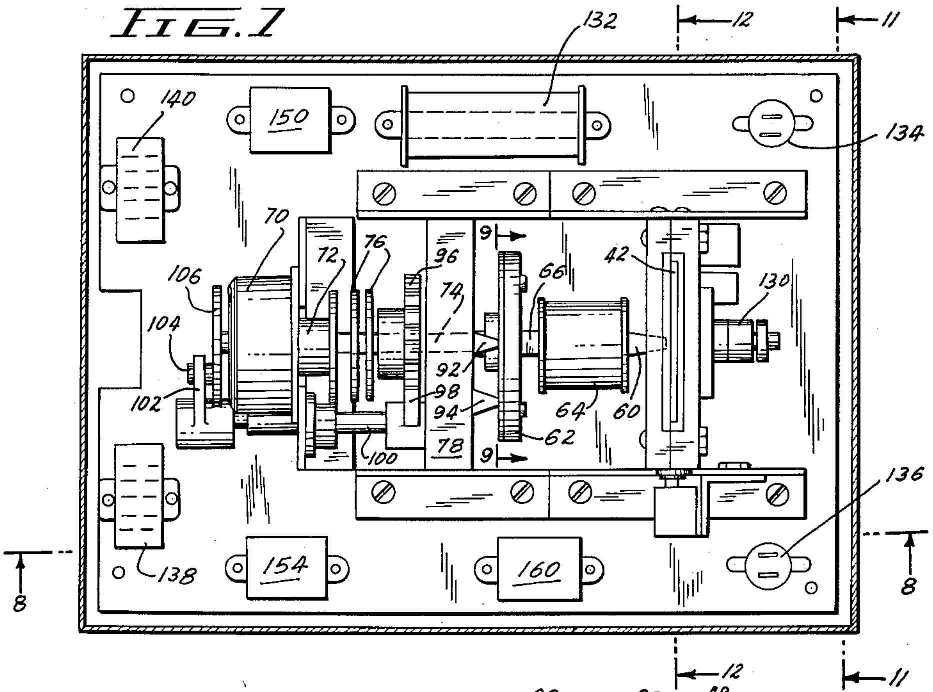
FIG. 7 is a plan view of the mechanism inside the validator unit.
Figure 8:
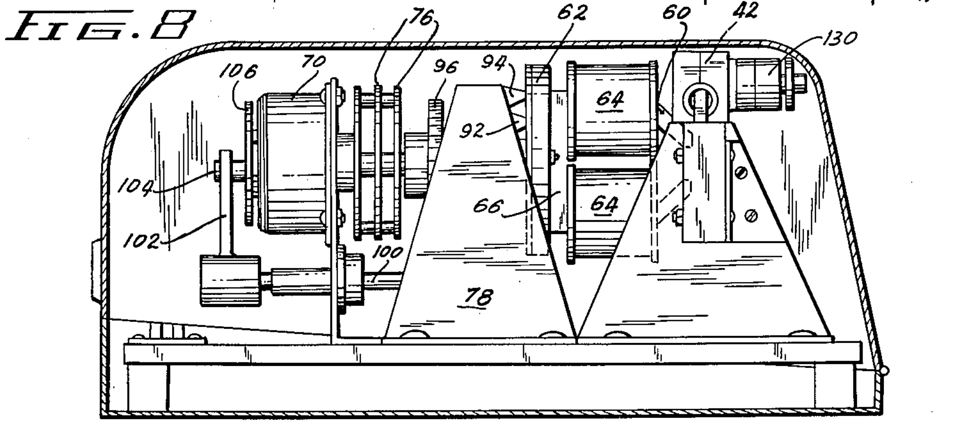
FIG. 8 is a vertical section taken approximately in the plane of the line 8—8 of FIG. 7.

Referring now to FIGS. 7 and 8, the bearing pedestal 78 also serves to carry the brushes or contact arms which engage the slip rings or plates. These are shown in rather schematic form at 92 and 94, and it will be understood that the brush 92 bears against the inner slip plate 80 (FIG. 9) while the brush 94 bears against the outer slip plate 82, and that the end of brush 94 is suitably rounded or shaped to mate resiliently with the detent holes 90, thus helping locate the main magnet 60 in any desired one of twenty-four angular positions.

Inasmuch as the main magnet 60 has considerable mass and inertia, I prefer to add an additional check pawl to guard against overtravel of the magnet when its position is being changed under remote control. For this purpose I provide a reversely faced ratchet wheel 96, and a dog 98 carried at one end of a shaft 100, the other end of which carries an arm 102 cooperating with a crank pin 104 mounted on a disc 106 which forms a part of the rotary solenoid 70. The timing is such that the stop dog 98 moves into engagement with the teeth of ratchet wheel 96 in time to prevent overtravel, and then is moved out again as the solenoid returns to rest position, thus freeing the ratchet wheel 96 preparatory to the next movement in the step-by-step operation of the system.

Figures 12, 13:
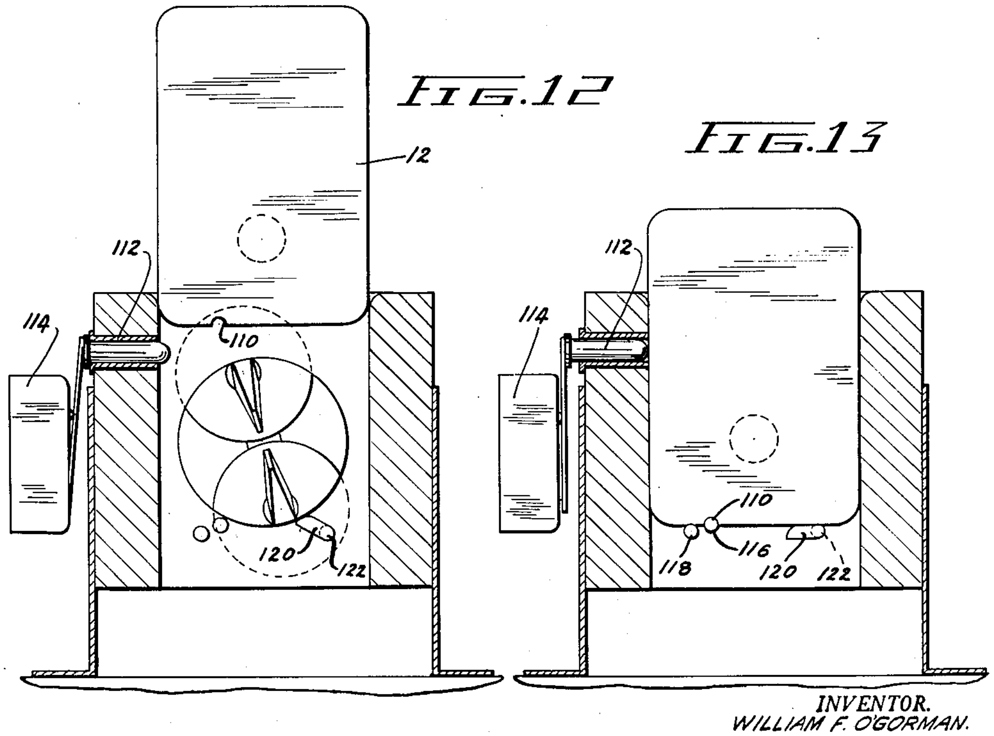
FIG. 12 is a transverse section taken approximately in the plane of the line 12—12 of FIG. 7.
FIG. 13 is a view similar to FIG. 12, but showing the pass fully inserted.

Assume the validator has been set, and that a worker leaving the plant presents his pass to the validator. Referring to FIGS. 12 and 13, the pass 12 has a notch 110 in its bottom edge, at a point which is off center. As the pass is inserted its side edge bears against a side feeler 112 which operates a microswitch 114, the purpose of which is explained later. When the pass reaches bottom position, as shown in FIG. 13, the notch 110 mates with a stationary stop 116, which may be supplemented by an additional stop 118. The pass engages a finger 120 pivoted at 122. This is normally raised slightly, as shown in FIG. 12, but is depressed by the bottom edge of the pass to the horizontal position shown in FIG. 13. This operates a microswitch, described later. It will be understood that if the pass does not have a notch 110 in the proper place, or if the pass is inserted wrong end downward, or wrong face toward the magnet, it will not come down far enough to shift the microswitch.

Figure 11:
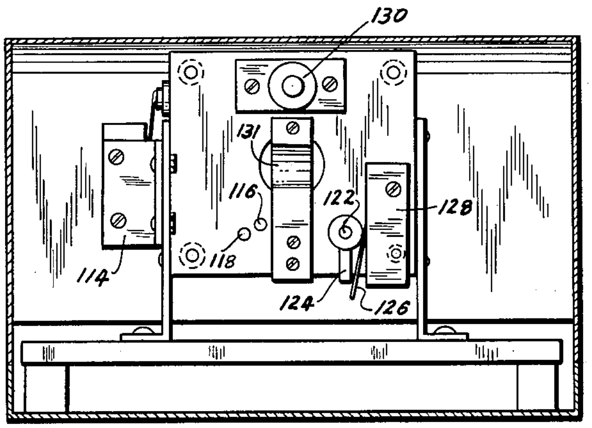
FIG. 11 is a transverse section taken approximately in the plane of the line 11—11 of FIG. 7.

Referring now to FIG. 11, the shaft 122 carries a finger 124 which bears against the operating spring 126 of a microswitch 128, here termed a "base" switch, in contradistinction to switch 114 which is termed a "side" switch. Both of these are pass operated. The switch 128 initiates magnetization of the main magnet 60, thereby magnetizing the disc in the pass. The part 131 in FIG. 11 acts to hold the pass close to the magnetizing magnet, in a manner which will be better understood when considering the corresponding detector part 362 shown in FIGS. 18 and 19 of the drawing. The spacing is adjustable by turning the top screw. The main magnet is deenergized as soon as the pass is lifted slightly.

Reverting now to FIGS. 7 and 8, the slot 42 has associated with it a third switch located at 130. This is operated by a small armature which is horizontally movable toward and away from the pass, and which is attracted to the pass by the magnetized disc within the pass as it is being raised from the slot after it has been validated. The side switch 114 prepares a circuit to energize a red lamp or other alarm, indicative of the fact that the pass has not been validated, but this is cancelled out by the switch 130 if the pass has been validated. Thus if the main magnet was not energized, or if the pass is a fake pass having no magnetic disc therein, or if for any other reason the pass is not magnetized after being pushed all the way down, a red light will show. This may be a brief light, or through a relay may remain lighted. Moreover, the plant exit is ordinarily provided with a barrier such as the turnstile 48 indicated in FIG. 1, and this is so wired that it is not released unless the green lamp is lighted.

If the pass is not pushed all the way down, or if it is inserted in reverse position from top to bottom or from front to back so that it cannot go all the way down, or if it is not notched, or if it has a notch in the wrong place, then neither the red nor the green lamp is lighted, and the holder of the pass is notified by his failure to see any light at all. In addition the turnstile is not released, which is further notification to all concerned that something is wrong. Thus the barrier will remain closed for either a red light, or the absence of any light, and will be released only if the green lamp is lighted.

*The validator wiring*

The validator is additionally described with reference to its wiring diagram, but it may be helpful to first revert to FIG. 7 and there point out that the part 132 is a rectifier to supply D.C. for the main magnet 60 and for the rotary solenoid 70 which also is D.C. operated. The connectors or sockets 134 and 136 are for connection to the pilot lamps mounted on the cover of the validator, as previously described. More specifically, a short flexible lead from each pilot lamp terminates in a two pole connector which is received by the connectors 134 and 136. This facilitates opening or/and removal of the cover. The connector 138 is a ten-wire connector used for connection to the remote control panel, and a similar ten-wire connector 140 may be used to extend the system on to another validator at another gate, as previously mentioned in connection with FIG. 1.

Figure 14:
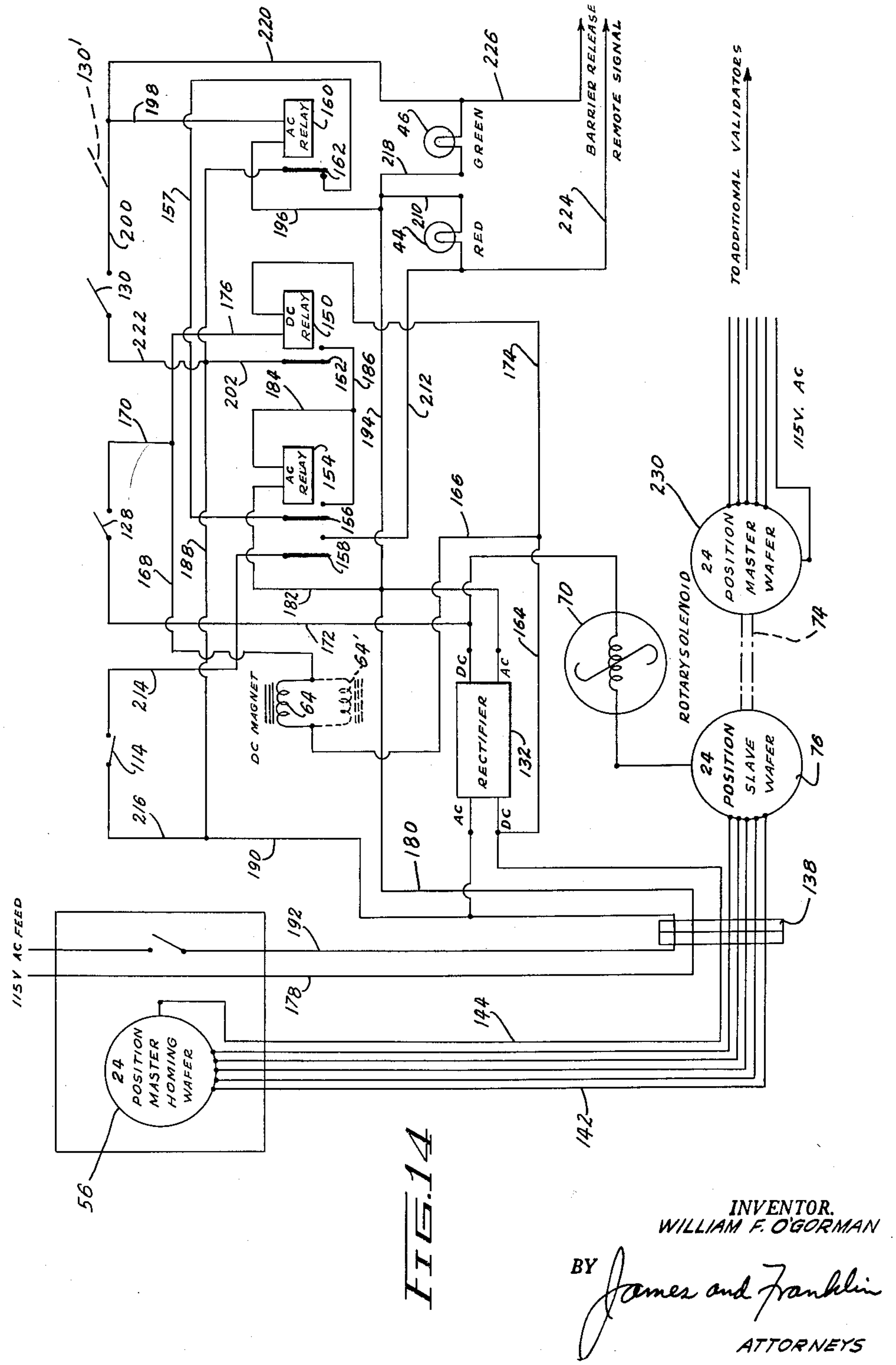
FIG. 14 is a wiring diagram for the validator.

The wiring diagram is given in FIG. 14 of the drawing. The remote control unit is shown at 56. This is connected by a multiple wire system 142 to the rotary solenoid 70 and a slave wafer switch or system of switches 76. In the present case in which there are twenty-four positions, the wiring employs five wires 142 and a return wire 144, the connection being made through the connector 138 previously referred to. The remainder of the wiring is for the validator itself. The red and green lamps are shown at 44 and 46. The pass operated side switch is indicated at 114, while the pass operated base switch is shown at 128, and the disc operated switch is shown at 130. The main magnet for magnetizing the pass is shown at 64, and its rectifier at 132. The side switch 114 is a single pole single throw switch which is normally closed. The base switch 128 is a single pole single throw switch which is normally open. The disc operated switch 130 is a single pole single throw switch which is normally open.

The base switch 128 has as its main purpose to energize the main magnet 64, and thus the switch 128 carries D.C. obtained from the terminals of rectifier 132 marked "D.C." The circuit for energizing magnet 64 includes conductors 164, 166, magnet 64, conductors 168, 170, base switch 128, and conductor 172 back to the rectifier 132. However, switch 128 also works a relay 150, which accordingly is a D.C. relay, but its contacts 152 carry A.C., which is used to energize an A.C. relay 154. The circuit of relay coil 150 includes conductors 164, 174, relay coil 150, conductors 176, 170, base switch 128, and conductor 172, back to the rectifier 132. The A.C. circuit for energizing the relay 154 includes conductors 178, 180, 182, the coil of relay 154, conductors 184, 186, contacts 152 of relay 150, conductors 202, 188, 190 and 192. Relay 154 is a holding or stick relay, and for that purpose has contacts 156. When contacts 156 close, the circuit of coil 154 is maintained even after contacts 152 of relay 150 open, and the circuit for this consists of conductors 178, 180, 182, coil 154, conductor 184, contacts 156, conductor 157, contacts 162, conductors 188, 190 and 192. The main purpose of relay 154 is to close contacts 158 which energize the red lamp 44. However, this is not energized while the pass is still in the slot, for the lamp circuit is opened by the side switch 114.

As the pass is pulled out of the slot the base switch 128 opens, thereby de-energizing the main magnet 64. As the pass rises further, if it has been properly magnetized, it closes the switch 130, which in turn energizes another A.C. relay 160, the contacts 162 of which are normally closed. The circuit of relay coil 160 may be traced through conductors 178, 180, 194, 196, relay coil 160, conductors 198, 200, disc operated switch 130, conductors 222, 188, 190, and 192. Contacts 162 are thereupon opened, and these are in the locking or stick circuit of the A.C. relay 154 previously mentioned. Thus the relay 154 is de-energized, and the red lamp is not lighted. However, if the pass has not been magnetized the contacts 162 remain closed, relay 154 remains locked, and the red lamp 44 is lighted as the pass is pulled out of the slot far enough for the side switch 114 to close. The circuit for red lamp 44 includes conductors 178, 180, 194, 210, lamp 44, conductor 212, relay contacts 158, conductor 214, side switch 114, conductors 216, 190 and 192.

On the other hand, if the pass has been properly magnetized the resulting closing of the disc operated switch 130 lights the green lamp 46. The circuit of lamp 46 includes conductors 178, 180, 194, 218, lamp 46, conductors 220, 200, disc operated switch 130, conductors 222, 188, 190 and 192. The lamp may be lighted briefly or, through an additional relay not shown, may remain lighted.

Before leaving FIG. 14 it may be pointed out that conductors 224 and 226 connected to the circuits of the red and green lamps, may be used for additional but related functions. For example, conductor 224 may operate a bell, (or a stick relay which controls a bell) so that there will be an audible as well as a visual alarm. It may extend to a remote visual and/or audible signal as, for example, inside the booth of a security guard. The conductor 226 may run to the barrier or turnstile release, so that it will be released when there is a green signal, but not otherwise. This release may require a momentary current, and again locks after one movement of the turnstile.

The wafer switch 230 is operated by the same shaft 74 as the slave wafer switch 76, and may itself act as a master switch having a five wire plus return wire system connected thereto and extending on to another validator at another gate, as was indicated at 40' in FIG. 1.

Referring to FIG. 4, the validator dial or knob 56 may be moved to any one of twenty-four positions, and it correspondingly moves the master wafer or wafer system 56 shown in FIG. 14. This results in rapidly repeated step-by-step operation of the rotary solenoid 70, until the slave wafer 76 has been moved to a position corresponding to that of the master wafer 56. The stepping of the "Ledex" system is automatic, and it is in order to satisfy the requirements of this automatic system that the multiple wire connections are employed. It will be understood, however, that a much simpler two wire system is adequate when using a key or button at the remote control station, which is simply manually pressed repeatedly to operate a solenoid pawl and ratchet wheel step by step until the main magnet has been turned to a desired angular position. Indeed the solenoid and ratchet used may be the very rotary solenoid here shown. A corresponding solenoid may operate a local indicator at the remote control station, in order to show to what position the magnet has been turned. Various other remote control systems may be used instead of that here shown, or none at all.

Figure 3:
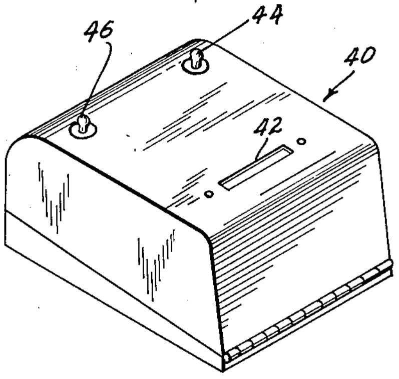
FIG. 3 is a perspective view of a validator used at an exit.

Reverting to FIG. 7, all of the mechanism shown at the left of the bearing 78 may be replaced by a simple manually operated knob. In that case the magnet is set manually at a desired angle. Referring to FIG. 3, the hinged casing 40 is locked by a suitable lock, and the key is in the possession of a security officer. At desired intervals, say once each day, he would open the validator and set it at a desired angle.

With multiple gates the validators may be set alike or may be set differently, as previously explained. With the particular remote control system shown in FIG. 14, the validators are set alike from a single remote control wafer 56. However, by using several masters wafers at the remote control point, one for each validator, they may be set independently of one another. In effect one merely moves the second master wafer 230 (FIG. 14) from its position on shaft 74 to the remote control point.

*The detector*

Figure 15:
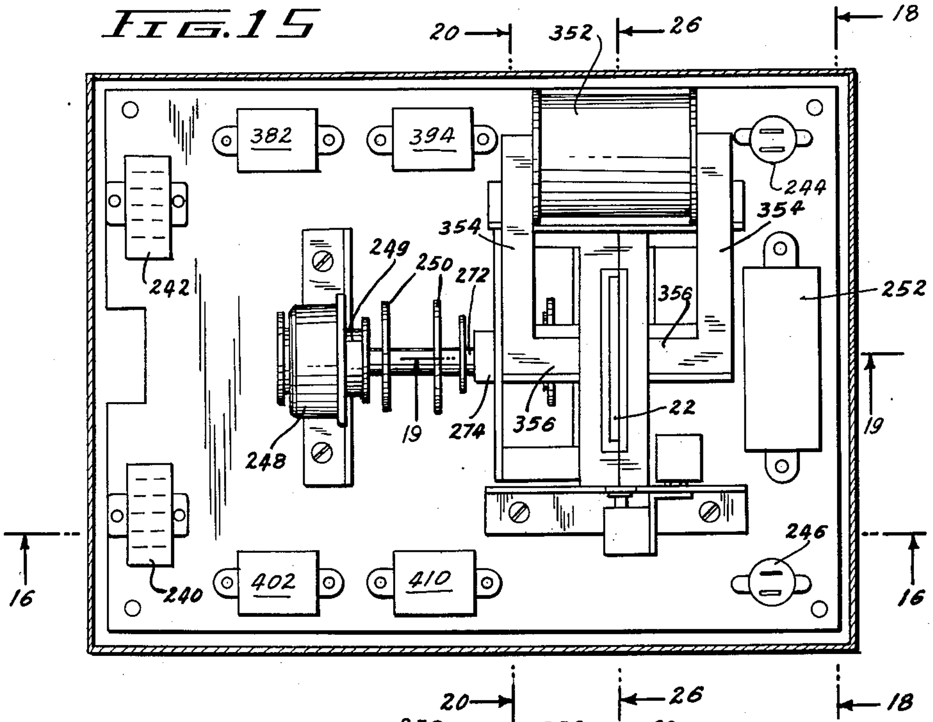
FIG. 15 is a plan view of the mechanism inside the detector.

The detector unit may be described with reference to FIGS. 15 through 29 of the drawing. Referring to FIG. 15, the arrangement is somewhat as in the validator in that the ten-wire connector 240 is for connection to a remote control unit, while a similar ten-wire connector 242 may be used to continue the system on to the detector at another gate. The pass is inserted in a slot 22 for examination by the detector. The two-wire connectors 244 and 246 are for connection to red and green pilot lamps on the hinged cover. The position of the detector magnet may be adjusted under remote control by means of a "Ledex" system, as previously described, this including a rotary solenoid 248 and a group of wafer switches generally designated 250. A rectifier 252 supplies D.C. for the system.

The underlying principle employed in the detector may be preliminarily described with reference to FIG. 17 of the drawing. A disc 254 has a circle of twenty-four holes 256 which cooperate with a detent (not shown). This disc is turned by the rotary solenoid 248 (FIG. 15) and its associated ratchet mechanism 249, as previously described. It carries a freely pivoted bar magnet 258 with a depending finger 260 which floats between stationary contacts 262 and 264. The finger is normally urged against contact 262 by means of a light hair spring 266. All of these parts are carried and moved bodily by the detent disc 254, but magnet 258 floats freely on its pivot.

The floating magnet 258 is disposed immediately adjacent the pass slot, and its axis is in alignment with the center of the magnetic disc in the pass. Assuming the validator was set for a horizontal axis of magnetism the preceding day, the detector is appropriately set for the present day, and in such case a proper pass will urge the magnet 258 to the diameter 270 shown, thus moving the finger 268 away from contact 262 and positioning it between the two contacts. This condition is utilized in appropriate circuitry to light a green lamp, to release a barrier, and so on. If, however, the pass is not a proper pass, and is either not magnetized, or is magnetized at an improper angle, the finger 260 will touch either contact 262 or 264, and the circuitry is such that the resulting effect is to light a red lamp and keep the barrier locked.

Apart from the angle of magnetism, the device may be designed also to require a correct degree of magnetization. For this purpose the detent disc 254 may be set as shown in FIG. 17 when the angle of magnetization in the pass is displaced further clockwise, as indicated by the axis 268. Thus the magnetic effect is to tend to move the magnet 258 to the axis 268, but this movement is resisted by the spring 266. When the magnetization is correct in both angle and degree the magnet is moved partway toward the diameter 268 to the position shown at 270, thus placing the finger 260 between the contacts. If the degree of magnetization is too small the finger 260 remains on contact 262. If the degree of magnetization is too large the finger reaches the contact 264. Thus both the angle and the degree of magnetization must be correct to satisfy the detector.

Figure 17:
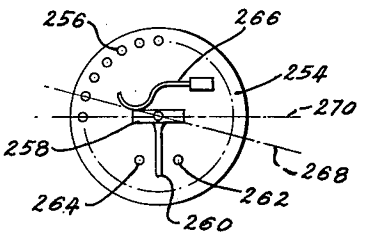
FIG. 17 is explanatory of a modification of a part of the detector.

The arrangement shown in FIG. 17 explains the theory, but is not an advantageous arrangement structurally, because it requires the use of slip rings, and the closing force at the contacts is slight rather than positive. The actual arrangement therefore differs, but the underlying principle is much the same.

Figure 16:
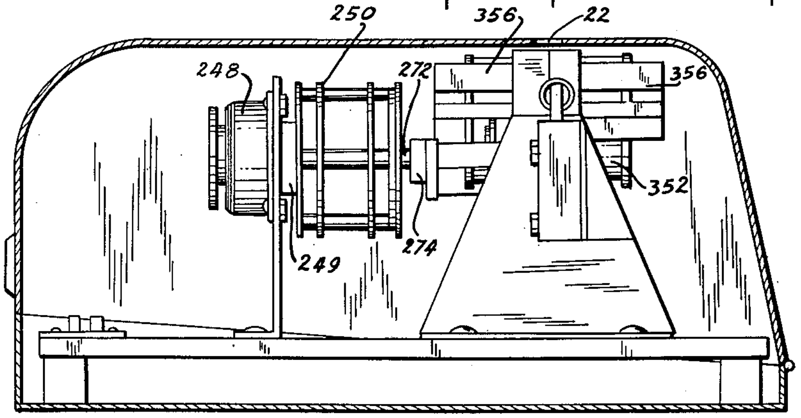
FIG. 16 is a vertical section taken in the plane of the line 16—16 of FIG. 15.
Figure 19:
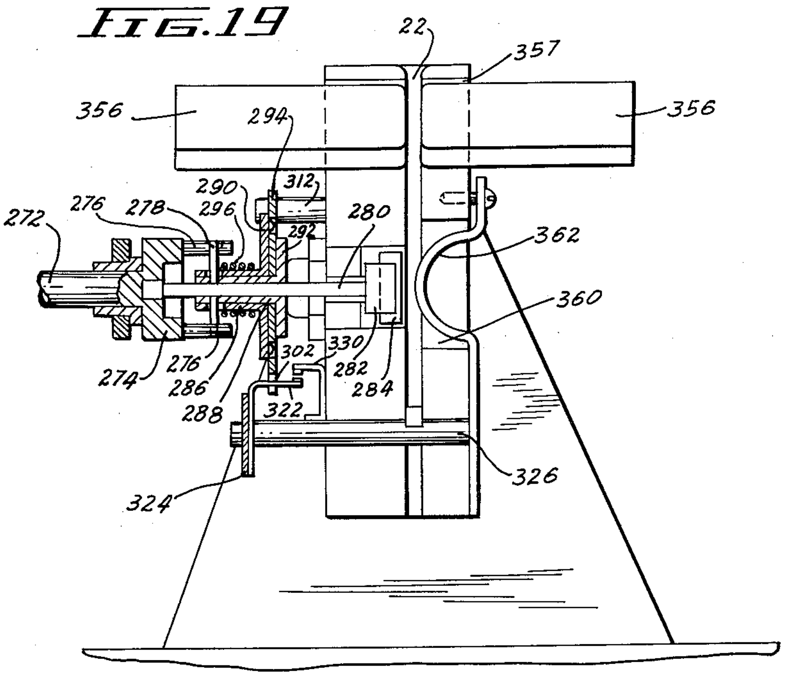
FIG. 19 is a fragmentary section taken in the plane of the line 19—19 of FIG. 15.

Referring to FIGS. 15 and 16 of the drawing, the shaft 272 which is turned under remote control carries a yoke 274, which in turn adjusts the position of the floating magnet. Referring now to FIG. 19 of the drawing, shaft 272 carries yoke 274 having spaced pins 276 which turn a cross pin 278 which passes through a shaft 280 having at its end a holder 282 for a small bar magnet 284. This is the detector magnet, and it is disposed immediately adjacent the slot 22, and in coaxial alignment with the center of the concealed disc in a proper pass.

The cross pin 278 also passes through concentric tubes 286 and 288, which in turn carry clutch discs 290 and 292. Between these there is disposed a notched disc 294. The discs are frictionally related by a compression spring 296.

Figure 24:
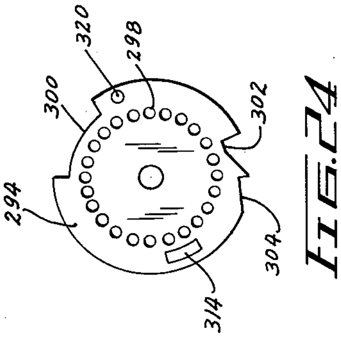
FIG. 24 shows a notched detent disc forming a part of the detector.
Figure 23:
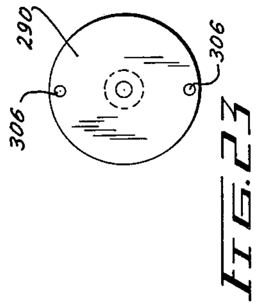
FIG. 23 is an elevation of a clutch disc forming a part of the detector.

Referring now to FIG. 24, the notched disc 294 has a ring of twenty-four detent holes 298. It also has a motion limit notch 300, a contact notch 302, and a stop notch 304. Referring now to FIG. 23, the clutch disc 290 has a pair of rounded detent projections 306 for cooperation with the holes 298.

Figure 25:
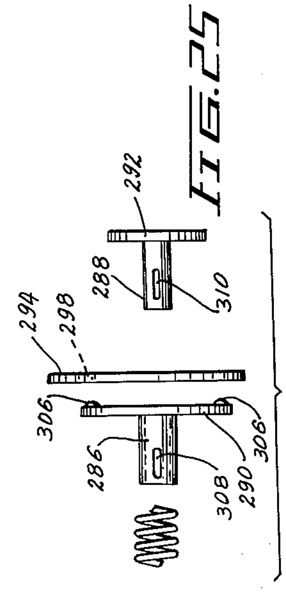
FIG. 25 is an exploded view showing the detent disc and associated parts.

The parts are shown in separated relation in FIG. 25, and it will be seen that sleeve 288 slides through notched disc 294 into sleeve 286. The detent projections 306 enter the detent holes 298. The slots 308 and 310 receive the cross pin 278 (FIG. 19) and afford some axial movement during rotation of discs 290 and 292 relative to disc 294.

Figure 22:
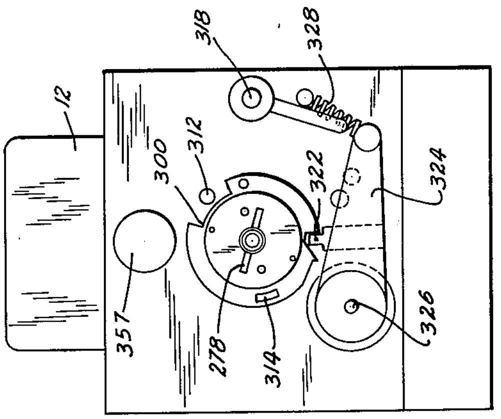
FIGS. 20, 21 and 22 are transverse sections taken approximately in the plane of the line 20—20 of FIG. 15, and illustrate different positions in the operation of the detector.
Figure 21:
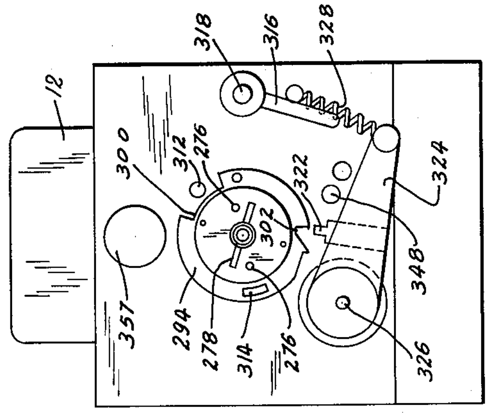
Figure 20:
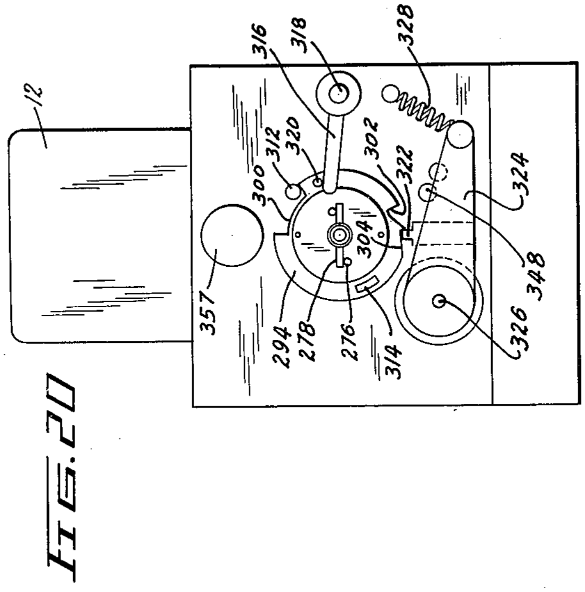

Referring now to FIGS. 20, 21 and 22, a stationary stop pin 312 is disposed in the motion limiting notch 300. The cross pin is shown at 278. The notched disc 294 is weighted at 314, and moves counterclockwise against pin 312, as shown in FIG. 20. It is positively moved to this position by clockwise rotation of a reset finger 316 pivoted on shaft 318 and bearing against a pin 320 carried by the notched disc 294. It may be held in the position shown by a contact arm 322 received in the stop notch 304 previously referred to.

In FIG. 20 a pass 12 is being inserted in the slot, and when it reaches bottom, as shown in FIG. 21, the contact arm 322 and the finger 316 are both moved away from the notched disc 294. This frees the notched disc for floating movement, and if the pass is a proper pass the magnetic characteristic of the pass pulls the detector magnet, and with it the entire assembly of discs, to a position as shown in FIG. 21, in which the motion limiting notch 300 is centered relative to the stationary pin 312. At this time the contact notch 302 is disposed over the contact arm 322, and when the pass is raised the contact arm 322 is released to rise into the notch 302, thus closing contacts which indicate that the pass is a proper pass. The contact arm 322 is carried by an arm 324 pivoted on a pin 326 and normally pulled upward by a spring 328.

It will be evident from the drawing that if the pass is magnetized at an improper angle, the notch 302 will not be disposed over contact 322. Also if the pass is not magnetized, or is insufficiently magnetized, the notched disc will remain in the position shown in FIG. 20, and, on the other hand, if it is excessively magnetized, the notched disc will be pulled clockwise to the end of the motion limiting notch 300. In either case the detector will not be satisfied. From the explanation given above in connection with FIG. 17, it will be understood that the angle of magnetization of the pass preferably is displaced from the angle of the magnet assumed in FIGS. 21 and 22. To be more specific, the motion limiting notch 300 in the present case corresponds to three of the twenty-four positions of the detent disc, and a proper pass causes the floating discs to assume the mid position. It must be proper in degree as well as angle of magnetism, as related to the weight 314.

Reverting now to FIG. 19, it will be understood that the entire assembly of discs 290, 292, 294 floats rotatably with the magnet 284, and without interference by the cross pin 278, for the motion is forward or away from the yoke pins 276. This will be seen also in FIG. 21, in which cross pin 278 has moved clockwise away from the yoke pins 276.

FIG. 19 shows how a vertically movable contact arm 322, carried by pivoted arm 34 may move upward into contact notch 302, in order to reach and engage a stationary contact 330. It is evident that these contacts 322, 330 cannot close when the floating notched disc 294 has not been properly oriented by detector magnet 284.

Figure 18:
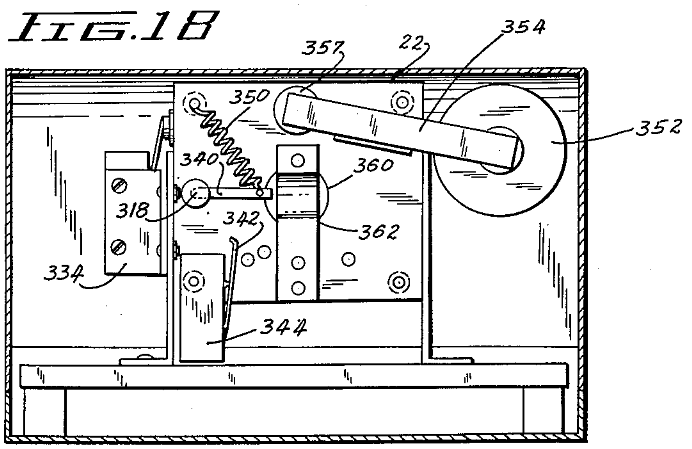
FIG. 18 is a transverse section taken in the plane of the line 18—18 of FIG. 15.

In FIGS. 18 and 19 it will be noted that one of the walls defining the slot 22 is cut away at 360 to receive a bent guide member 362 which helps position the pass close to the detector magnet 284.

Figure 26:
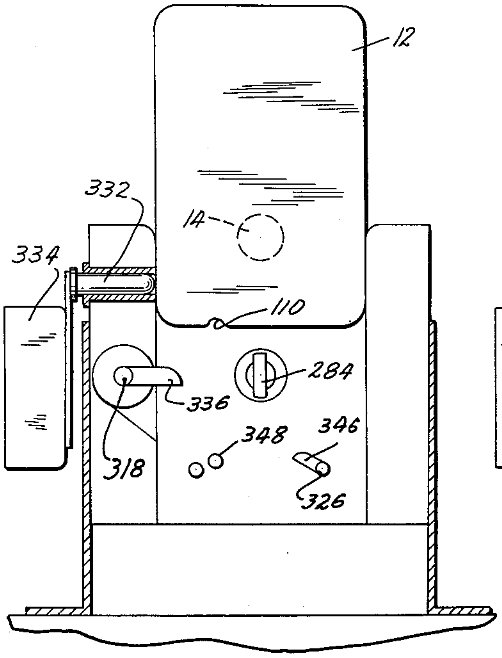
FIG. 26 is a transverse section taken approximately in the plane of the line 26—26 of FIG. 15.
Figure 27:
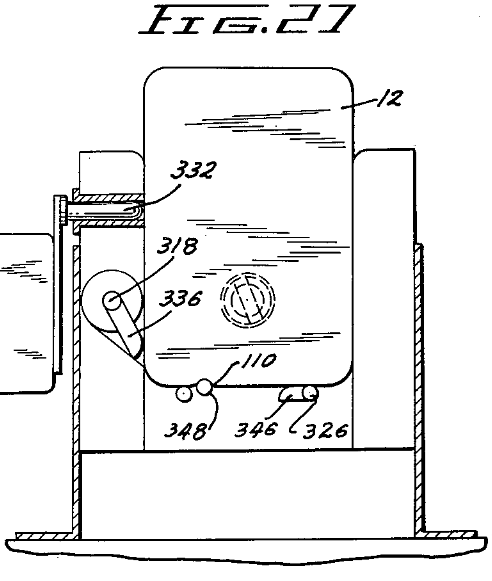
FIG. 27 is a similar view showing the relation of the parts when a pass is fully inserted.

Referring now to FIGS. 26 and 27 of the drawings, when pass 12 is inserted in the detector slot it first bears against a feeler 332 which shifts a microswitch 334, here referred to as a side microswitch. As the pass comes down further it turns a feeler 336 pivoted on a pintle 318 previously mentioned. Referring next to FIG. 18, the pintle 318 carries a finger 340 which is turned clockwise to bear against the actuating spring 342 of a microswitch 344, hereinafter referred to as the lower microswitch. Reverting now to FIGS. 26 and 27, when the pass 12 has been fully inserted, as shown in FIG. 27, it bears against a third feeler 346 pivoted on a pintle 326. It will be recalled by reference to FIGS. 20, 21 and 22 that pintle 326 carries the arm 324 with its vertically movable contact 322, which acts also as a stop for the detent disc. In FIG. 27 the stop 348 mates with notch 110 of the pass, the arrangement being such that if the notch is not properly located, or if the pass has been inverted from top to bottom or from front to back, the feeler 346 will not be sufficiently depressed to release the notched disc for floating movement. On the other hand, when a pass is properly and fully inserted, the notched disc is released for floating movement, and when the pass is raised slightly, the contacts 322, 330 (FIG. 19) will be closed if the angle and degree of magnetization were correct.

As the pass is raised further to the position shown in FIG. 26 the feeler 336 rises from the position of FIG. 27 to that of FIG. 26, and reverting to FIG. 18, the lower microswitch 344 is actuated, and this closes the circuit of an erasing magnet, explained later. The arm 340 is raised by pull spring 350. The resulting motion serves another purpose which may be explained with reference to FIGS. 21 and 20. It swings the reset finger 316 from the position shown in FIG. 21 up to the position shown in FIG. 20, so that it bears against the pin 320 and so restores the notched disc 294 back to the initial position shown in FIG. 20, where it is held both by finger 316 and contact arm 322. The weight 314 also tends to move the notched disc back, but its main purpose is to resist turning of the notched disc by the detector magnet, in proper relation to the degree of magnetization of the pass. From this view point the weight 314 replaces the spring 266 shown in FIG. 17. When the pass is fully removed the feeler 332 (FIG. 26) moves inward, thus changing side microswitch 334, and this stops the excitation of the erasing magnet.

Figures 28, 29:
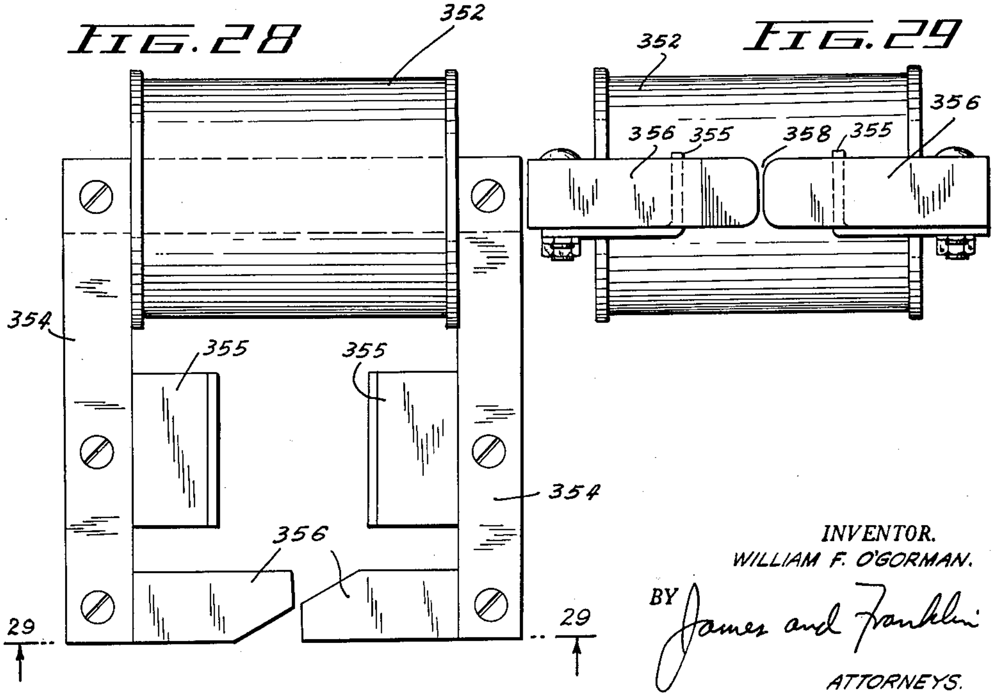
FIG. 28 is a plan view of an erasing magnet forming a part of the detector unit.
FIG. 29 is an end view of the erasing magnet looking in the direction of the arrows 29—29 of FIG. 28.

The erasing magnet is shown separated from the rest of the mechanism in FIGS. 28 and 29. It is excited by a magnet coil 352, and the core has arms 354 terminating in poles 356 which are nearly closed but which have a small gap at 358 in which the pass is received. If desired, the poles may be cut away or biassed as shown, but this is not essential.

The location of the eraser magnet will be clear from FIGS. 15, 16, 17, 18 showing how coil 352 is disposed at one side of the slot 22, while the arms 354 of the core straddle the slot, so that the poles 356 project inward to the slot. The poles are positioned in vertical alignment with the magnetic disc in the pass, so that the latter will move between the poles as the pass is being removed from the detector unit. The poles 356 of the erasing magnet reach the slot through holes 357 shown in FIGS. 18, 19 and 20. They are supported by bent strips 355.

*The detector wiring*

Figure 30:
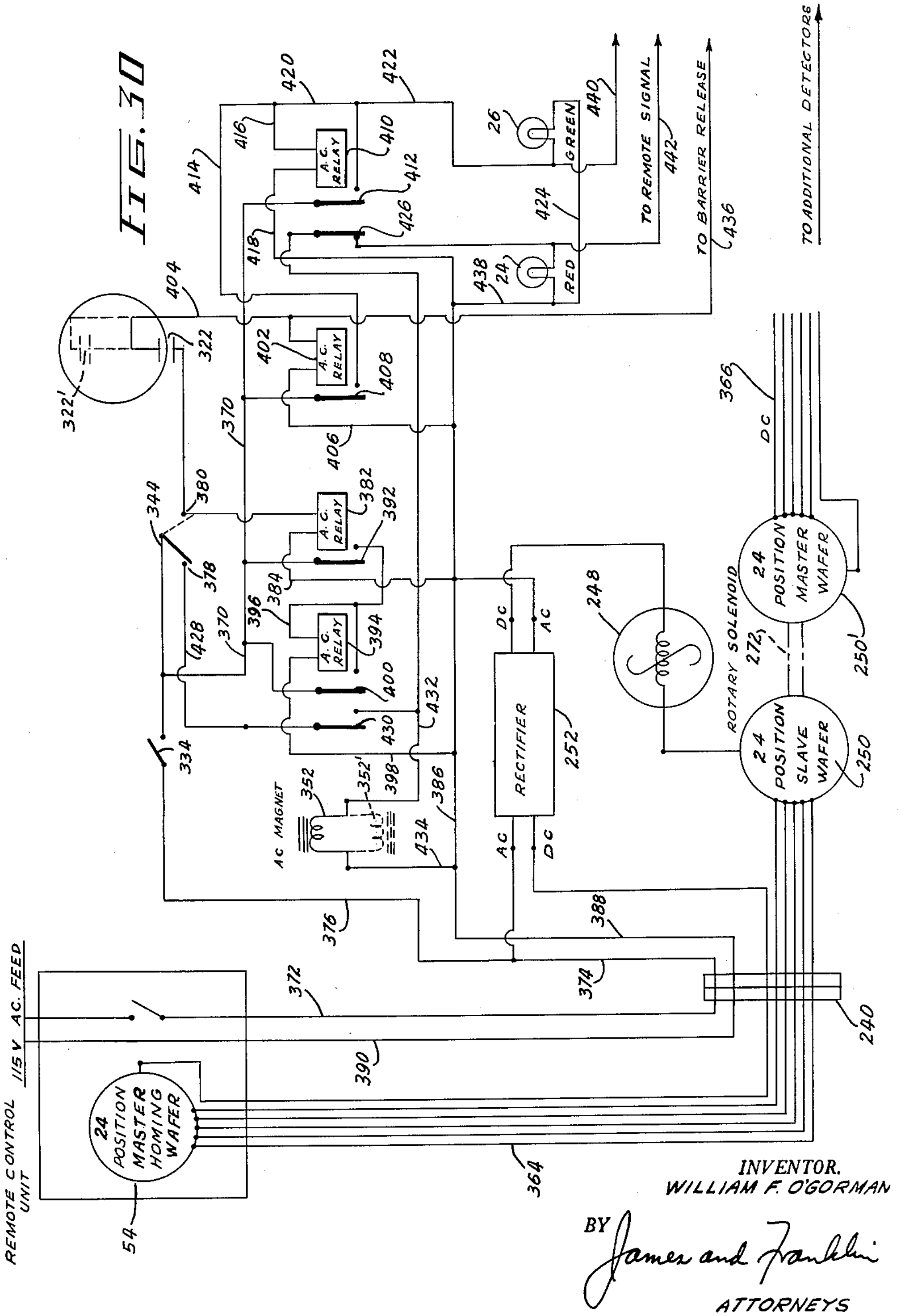
FIG. 30 is a wiring diagram for the detector.

The operation of the detector may be further explained with reference to the wiring diagram of FIG. 30. The remote dial or control for determining the position of the detector magnet relative to the notched detent disc is indicated at 54. It is connected by a multiple wire system 364 to a slave wafer switch 250 and a rotary solenoid 248 which operates the same, the connection being through a suitable connector 240, as previously explained. Another master wafer switch 250' may turn with the slave wafer 250 and its shaft 272, and be connected through a multiple conductor system 366 to a detector at another gate, all as previously explained. In this case the circuits again have five wires and a return.

The indicator lamps are shown at 24 and 26. The contacts controlled by the floating magnet are shown at 322. The erasing magnet coil is shown at 352. The side microswitch is shown at 334. This is a single pole single throw switch which is normally open. The lower microswitch is shown at 344. This is a single pole double throw switch which is normally closed to the left contact. The rectifier is shown at 252.

As the pass is inserted it closes the side microswitch 334, which supplies current to the lower switch 344, and also to a conductor 370 which acts as a feed line to most of the relay contacts. The supply circuit is from line 372 through connector 240, conductors 374, 376, switch 334, to conductor 370.

As the pass moves further down it shifts the lower switch 344 from the lefthand contact 378 to the righthand contact 380. This energizes the relay coil 382 and the contacts 322, the circuit of the relay coil being completed by conductors 384, 386, 388, and 390. Relay 382 closes its contacts 392, which energize relay coil 394. The circuit is from conductor 370 to contacts 392, and conductor 396 to coil 394, and thence through conductors 398, 386, 388 and 390. Relay 394 is a holding or stick relay, and it remains closed because of its holding contacts 400, which, when closed, establish a circuit from conductor 370 through contacts 400 to conductor 396 and thence to coil 394, as previously described.

When the pass hits bottom it releases the detector magnet, and it and the notched disc take a position which is here assumed correct for a proper pass. When the pass begins to rise the contacts 322 close.

When these contacts close they energize a relay coil 402 by way of conductor 404, coil 402, conductors 406, 386, 388 and 390. This closes relay contacts 408, thereby energizing relay coil 410 which is a holding or stick relay, and for this purpose has holding contacts 412. The circuit of coil 410 is from conductor 370, contacts 408, conductors 414, 416, to the coil, the return being by way of conductors 418, 386, 388 and 390. When holding contacts 412 are closed the energizing circuit is from conductor 370 through contacts 412, conductors 420 and 416 to the coil, and thence back to the line, as previously recited.

The energization of relay coil 410 is accompanied by lighting of the green lamp 26, this being by way of conductor 422 to lamp 26 and thence back by way of conductors 424, 438, 386, 388 and 390. The energization of relay 410 opens its contacts 426.

The closing of detector contacts 322 also energizes conductor 436 leading to a barrier or turnstile release. This is of a type which requires only momentary energization, and the barrier then remains released until one person passes through, whereupon it again locks.

As the pass is removed the lower microswitch is changed back from contact 380 to contact 378. This closes a circuit through conductor 428, through the then closed contacts 430 of relay 394, thereby energizing the erasing magnet 352 through conductor 432, erasing magnet 352, conductors 434, 388 and 390.

As the pass moves upward the side microswitch 334 is opened, and that de-energizes most of the circuit for it de-energizes the conductor 370 which supplies most of the relay contacts. The green lamp lights, and the barrier is released, and remains released for the passage of one person.

It has so far been assumed that the pass is a proper pass. If the pass is improper, the side microswitch 334 and the lower microswitch 344 will have been operated on the way down, as described above, but as the pass begins to be removed the contacts 322 will not close, and therefore relay 402 will not be energized, and consequently the contacts 408 remain open, and relay 410 is not energized, and therefore the contacts 426 remain closed, thus preparing a circuit through the red lamp 24.

Meanwhile the barrier release conductor 436 is not energized because of failure of contacts 322 to close, and therefore the turnstile is not released.

As the pass rises and moves beyond the lower microswitch 344 the latter is shifted from contact 380 to contacts 378, thereby energizing the erasing magnet, through conductor 428 and contacts 430 and conductor 432. This is preferred in order to wipe out any magnetism in the pass. At the same time energy supplied to line 432 flows also to the right to the contacts 426 of relay 410, which now remain normally closed, and thus energizes the red lamp 24, its return circuit being through conductors 438, 386, 388 and 390.

As previously explained, a conductor 440 connected to green lamp 26 and a conductor 442 connected to red lamp 24 may be used to operate an audible alarm, or remote lamps and an alarm, as in the booth of a security guard, or even back in the main security office. Stick relays may be used for a maintained alarm.

The energization of the erasing magnet is by means of alternating current, and the motion of the pass through and beyond the erasing magnet causes a tapering off of the amplitude of the erasing cycles, thus effectively erasing the previous magnetization of the pass. Total erasure is not required, for the validator applies a new magnetization which dominates the old, but in the present apparatus an erasure of about 90% of the magnetization is obtained.

It will be understood that the remote control system may be of any desired type, and as previously explained a simple two wire system using a key at the remote control station may be used to position the detector magnet step by step, by means of a pawl and ratchet system. A local pawl and ratchet may be located at the key. In fact the rotary solenoid here shown may be used in that manner. Moreover, it is not necessary to provide remote control at all, and instead a security officer provided with a key may unlock the detector casing and manually position the detent disc of the detector unit by means of a simple control knob on shaft 272.

*Multiplied security system*

It has already been mentioned that the detector and validator as so far described are in somewhat elementary form in which the code characteristic impressed on the pass consists of a single angular magnetization of proper strength. The degree of security provided may be enormously heightened by providing each pass with two magnetizable discs which are independently magnetized, in respect to both angle and degree, and a pass might be provided with an even greater number of discs.

A system employing two discs may be described with reference to FIGS. 31–34 of the drawings. Referring to those figures, and more particularly FIG. 33, the pass 450 has concealed therein thin discs 452 and 454, these being made of Alnico #2 or other special alloy.

Figure 32:
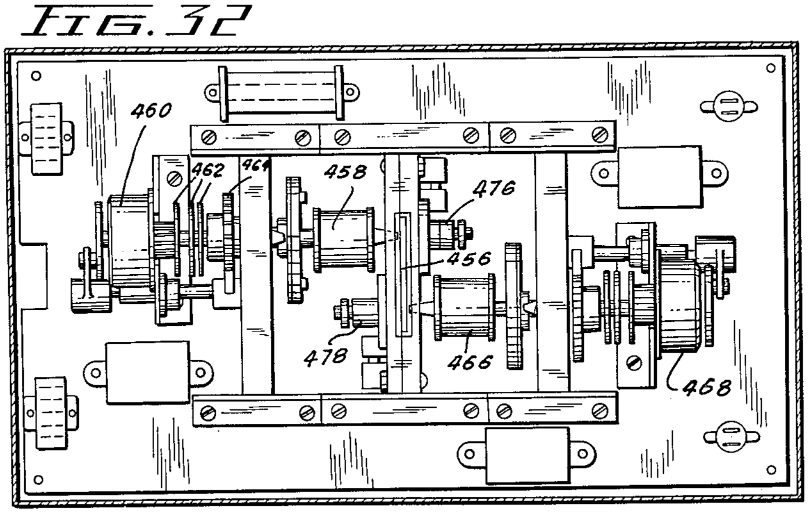
FIG. 32 is a similar view of the mechanism in a modified or double validator.
Figure 33:
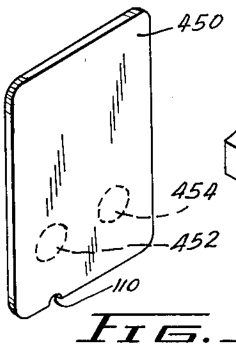
FIG. 33 is a perspective view of a modified pass for the double detector and validator.

Referring now to FIG. 32, the validator is essentially two validators, each as previously described, with one located on one side of the slot 456, and the other on the other side, thus providing ample room for the mechanism. Specifically, a main or magnetizing magnet 458 is turned to desired angle by a remote control system including a rotary solenoid 460 and wafer switches 462 with a stop ratchet 464, all as previously described. There is also a second main magnet 466 rotated to desired angle by a rotary solenoid 468 and similar associated mechanism, all as previously described.

Figure 34:
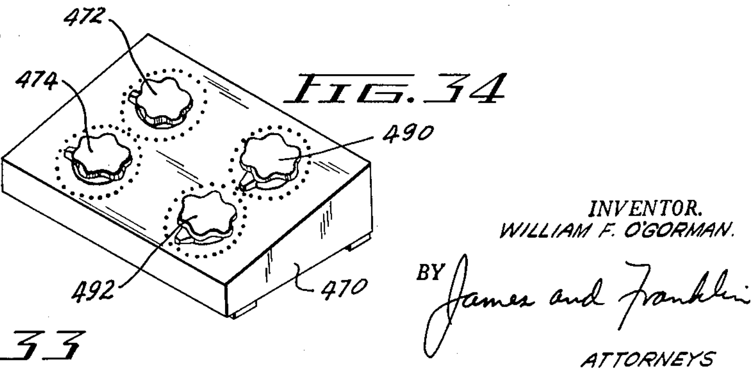
FIG. 34 is a perspective view of a modified remote control unit for the double detector and validator.

Referring now to FIG. 34, the remote control unit 470 is like that previously described, except that there are two dials 472 and 474 for the two validator magnets. Thus any desired combination of angles may be provided, and the number of code characteristics available is increased from twenty-four to five hundred seventy-six (twenty-four multiplied by twenty-four).

In respect to the wiring of the double validator shown in FIG. 32, reference may be made to the validator wiring already described in FIG. 14. One change is that the magnet 64 is duplicated by a parallel connected magnet 64'. Both magnets are energized together when the pass has been fully inserted in the slot (the magnets 64 and 64' in FIG. 14 corresponding to magnets 458 and 466 in FIG. 32). The remote control wafers and wiring therebetween are, of course, duplicated in order to obtain independent control of the angular position of the two magnets. A single side switch 114 and a single base switch 128 may be used exactly as previously described. However, the disc operated switch 130, which is closed only if the pass has been properly magnetized may, if desired, be duplicated by providing another identical switch 130' in series with the switch 130, so that the circuit will be closed only if both discs of the pass have been magnetized. This is shown in FIG. 32 by the provision of two magnetically operated switches marked 476 and 478, and which correspond to 130, 130' in FIG. 14.

Figure 31:
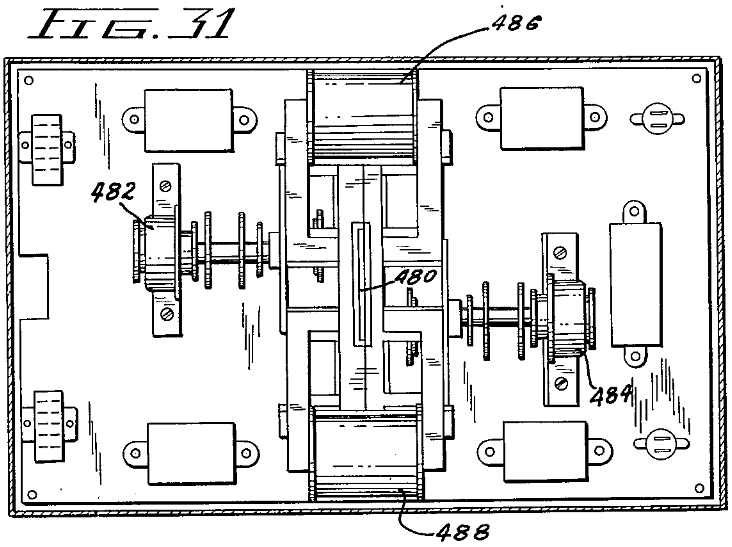
FIG. 31 is a plan view of the mechanism in a modified or double detector.

The double detector is shown in FIG. 31, and, as before, there is a slot 480 into which the pass is inserted. The rest angle of one magnet is determined by remote control means including rotary solenoid 482 and associated mechanism. The rest angle of the other detector magnet is determined by rotary solenoid 484 and associated mechanism. Two erasing magnets are provided, one being indicated at 486 and the other at 488.

Reverting to FIG. 34, the remote control unit 470 has two detector dials 490 and 492 for independently controlling the angular position or rest angle of the two detector magnets.

The wiring is the same as that described in connection with FIG. 30, except that the floating magnet contacts 322 will be connected in series with additional floating magnet contacts 322', so that both sets of contacts must be closed in order to satisfy the detector. A single side switch 334 and a single lower switch 344 may be employed, as previously described. The erasing magnet 352 is duplicated by another erasing magnet 352' connected in parallel with erasing magnet 352. These correspond to the erasing magnets 486 and 488 shown in FIG. 31. The remote control wafer and wiring are duplicated in order to secure independent control of the physical position of the detector magnets.

In connection with the double units, as with the single units, any desired remote control system may be used, or none at all, it being sufficient to provide the validator magnets and the detector magnets each with a simple knob for turning the respective detent discs, the security officer being provided with a key to unlock the casings to change the settings from time to time, say daily.

It is believed that the construction, operation, and method of use of my improved security system, as well as the advantages thereof, will be apparent from the foregoing detailed description. The pass may be a normal looking pass, and may carry the usual information such as name, photograph, signature, fingerprint, or whatever else may be desired. In addition it contains material which is adapted to be impressed electronically with a normally retained but erasable code characteristic. The pass is presented to a detector, which must be satisfied as to the code characteristic, failing which appropriate alarm means may be provided, in addition to which a barrier may be controlled. The code characteristic is readily changed, and is changed from time to time, even daily. The pass is presented to a validator which impresses it with a code characteristic for entrance the next day. Changes in the validator and detector may be made locally, or under remote control. A plant having multiple gates may be provided with detectors and validators at each gate, and these may be set alike, or set differently, as desired. The code characteristic is erased from the pass each time it has been presented to the detector. The validator checks whether the pass has been validated, and if not an appropriate alarm may be provided. The degree of security provided may be multiplied by the provision of a plurality of different characteristics, all of which must simultaneously satisfy the detector.

It will be understood that the circuitry may be modified to make use of the signal lamps in variant ways. For example, I have built a system modified so that the green lamp remains normally lighted. It is extinguished when the pass is inserted all the way to the bottom thus showing the pass holder that he has inserted the pass with the notch in proper position and sufficiently far down. A lamp again lights as the pass begins to rise. At the validator, if the pass is magnetized, the green lamp is relighted, but if the pass is not magnetized, the red lamp is lighted instead of the green lamp. At the detector, if the pass is a proper pass, the green lamp is relighted, but otherwise the red lamp is lighted instead of the green lamp. In each case the barrier is released if the green lamp is relighted, but is not released if the red lamp is lighted. When the red lamp is lighted it remains lighted until intentionally extinguished by a security officer.

It will be understood that while I have shown separate paths and turnstiles for entrance and exit, it is possible to use a single path and a single turnstile, the latter being of a type which can turn or lock in either direction. It is released for movement in one direction by the detector, and it is released for movement in the other direction by the validator. In all cases the validator and detector are preferably kept far enough apart so that someone seeking to enter the plant cannot put his pass in the validator first and then in the detector. This would not help when the validator is set differently from the detector, as when the next day's code characteristic is to be different, but it would help when the code characteristic is changed at longer intervals instead of daily. In any case the apparatus locations and the adjacent fences are such that only a person leaving the plant has access to the validator, while those outside the plant do not, and, conversely, someone using the detector is kept somewhat remote from the plant, so that he cannot be handed a pass by someone remaining inside the plant.

It will therefore be apparent that while I have shown and described the system in several preferred forms, changes may be made in the structures shown, without departing from the scope of the invention, as sought to be defined in the following claims.

In the claims the reference to an enclosure having an exit and an entrance is not intended to exclude the use of a single passage as both an exit and an entrance, as mentioned above.

I claim:

1. A security system for protecting an enclosure having an exit and an entrance, said system comprising a pass card having a magnetic material adapted to be impressed magnetically with a normally retained but erasable code characteristic, a validator at an exit to magnetically impress the pass with a desired code characteristic for the next admittance, and a detector at an entrance to check whether the pass has the proper code characteristics, said magnetic material being a disc adapted to be magnetized diametrically at any desired angle, said validator including a magnet having its poles located diametrically of said disc and rotatably mounted to magnetize said disc at any desired angle, and said detector including a magnetic means pivoted on the axis of said disc adjacent said disc and responsive to the angle of magnetization of the disc.

2. A security system as defined in claim 1, in which the detector is connected to suitable indicator means to differentiate between a proper and improper pass.

3. A security system as defined in claim 1, in which the validator is provided with an indicator means made operative if a pass presented thereto is not magnetized by the validator.

4. A security system as defined in claim 1, in which said detector is provided with an electromagnetic eraser means and appropriate switch means to make the eraser means operative only during withdrawal of the pass subsequent to presentation of the pass to the detector for inspection thereby.

5. A security system as defined in claim 1, in which there is a validator control, a detector control, and electro-mechanical means, whereby the rotative position of the validator magnet and the normal detector position of the detector magnet may be controlled from a suitable remote point such as a security office by means of said validator control and said detector control respectively.

6. A security system as defined in claim 1, in which there is a validator control, a detector control, and electro-mechanical means, whereby the rotative position of the validator magnet and the normal detector position of the detector magnet may be controlled from a suitable remote point such as a security office by means of said validator control and said detector control respectively, and in which there are a plurality of exits each having a validator, all of which are positioned alike in response to the validator remote control means, and a plurality of entrances each having a detector, all of which are positioned alike in response to the detector control at the remote control means.

7. A security system as defined in claim 1, in which each pass is provided with a plurality of magnetic discs, and in which each validator is provided with a mating plurality of validating magnets each of which is angularly positionable independently of the other, and in which the detector is provided with a plurality of detector magnets pivoted in registration with said plurality of discs for independent response thereto.

8. A security system as defined in claim 7, in which each detector is responsive to the degree or strength of magnetization as well as the angle of magnetization of the mating magnetic disc in the pass, whereby in order to satisfy the detector the magnetization of each disc must be correct in degree as well as in angle.

9. A security system as defined in claim 1, in which each pass is provided with a plurality of magnetic discs, and in which each validator is provided with a mating plurality of validating magnets each of which is angularly positionable independently of the other, and in which the detector is provided with a plurality of detector magnets pivoted in registration with said plurality of discs for independent response thereto and in which there is a remote control means which includes an independent control for each of the validator magnets and an independent control for each of the detector magnets.

10. A security system as defined in claim 1, in which the detector is responsive to the degree or strength of magnetization as well as the angle of magnetization of the magnetic disc in the pass, whereby in order to satisfy the detector the magnetization must be correct in degree as well as in angle.

11. A security system as defined in claim 1 in which each pass is provided with a plurality of magnetic discs, and in which the validator is provided with a mating plurality of validating magnets each of which is angularly positionable independently of the other, and in which the detector is provided with a plurality of detector magnets pivoted in registration with said plurality of discs for independent response thereto.

12. A security system as defined in claim 1 in which each pass is provided with a plurality of magnetic discs, and in which the validator is provided with a mating plurality of validating magnets each of which is angularly positionable independently of the other, and in which the detector is provided with a plurality of detector magnets pivoted in registration with said plurality of discs for independent response thereto, and in which the detector is responsive to the degree or strength of magnetization as well as the angle of magnetization of the magnetic disc in the pass, whereby in order to satisfy the detector the magnetization must be correct in degree as well as in angle.

13. A security system for protecting an enclosure having an exit and an entrance, said system comprising a pass card having concealed therein a magnetic material adapted to be impressed magnetically with a normally retained but erasable code characteristic, a validator at an exit to magnetically impress the pass with a desired code characteristic for the next admittance, and a detector at an entrance to check whether the pass has the proper code characteristic, said concealed magnetic material being a thin disc of a highly magnetic substance such as Alnico #2 adapted to be magnetized diametrically at any desired angle, said validator including an electromagnet having its poles located diametrically of said disc and rotatably mounted to magnetize said disc at any desired angle, and said detector including a magnetic means pivoted on the axis of said disc adjacent said disc and responsive to the angle of magnetization of the disc.

14. In a security system for protecting an enclosure having an exit and an entrance, said system comprising a pass card having concealed therein a disc of a magnetic substance adapted to be magnetized diametrically at any desired angle, and a validator at an exit including an electromagnet having its poles localized at and located diametrically of said disc and rotatably mounted to magnetize said disc at any desired angle, and readily operable control means to rotate said electromagnet in small increments in order to change the angle of magnetization from time to time.

15. A security system as defined in claim 14, in which the validator is provided with an indicator means made operative if a pass presented thereto is not magnetized by the validator.

16. A security system as defined in claim 14, in which there is a validator control and electromechanical means whereby the rotative position of the validator magnet may be controlled from a suitable remote point such as a security office by said validator control.

17. A security system as defined in claim 14, in which there is a validator control and electromechanical means whereby the rotative position of the validator magnet may be controlled from a suitable remote point such as a security office by said validator control, and in which there are multiple exits each provided with a validator, all of which are positioned alike in response to the validator control at the remote control point.

18. A security system as defined in claim 14, in which each pass is provided with a plurality of magnetic discs, and in which the validator is provided with a mating plurality of validating magnets each of which is angularly positionable independently of the other.

19. In a security system for protecting an enclosure having an exit and an entrance, said system comprising a pass card having concealed therein a disc of a magnetic substance adapted to be magnetized diametrically at any desired angle, a detector at an entrance including a magnetic means localized at and freely pivoted on the axis of said disc adjacent said disc and thereby being tilted by said disc operating as a control magnet in order to be responsive to the angle of magnetization of the disc.

20. A security system as defined in claim 19, in which the detector is connected to suitable indicator means to differentiate between a proper and improper pass.

21. A security system as defined in claim 19 in which said detector is provided with an electromagnetic eraser means and appropriate control means to make the eraser means operative only during withdrawal of the pass subsequent to presentation of the pass to the detector for inspection thereby.

22. A security system as defined in claim 19, in which there is a detector control and electromechanical means whereby the normal detector position of the detector magnet may be controlled from a suitable remote point such as a security office by said detector control.

23. A security system as defined in claim 19, in which there is a detector control and electromechanical means whereby the normal detector position of the detector magnet may be controlled from a suitable remote point such as a security office by said detector control, and in which there are a plurality of entrances each having a detector, all of which are positioned alike in response to the detector control at the remote control point.

24. A security system as defined in claim 19, in which each pass is provided with a plurality of magnetic discs, and in which the detector is provided with a plurality of detector magnets pivoted in registration with said plurality of discs for independent response thereto.

25. A security system as defined in claim 19, in which the detector is responsive to the degree or strength of magnetization as well as the angle of magnetization of the magnetic disc in the pass, whereby in order to satisfy the detector the magnetization must be correct in degree as well as in angle.

26. A security system for protecting an enclosure having an exit and an entrance, said system comprising a pass card having a plurality of separate small areas of magnetic material adapted to be magnetized to provide a normally retained but erasable code characteristic, a validator at an exit to magnetize the areas independently of one another in desired direction, and a detector at an entrance to check whether the pass has the proper code characteristic, said validator including a plurality of magnets each with its poles located adjacent a corresponding magnetizable area of the card, and including means to control the direction of magnetization caused by each magnet, and said detector including a plurality of magnetic means each adjacent a corresponding magnetizable area of said card and each being responsive to the direction of magnetization of that area.

27. A security system as defined in claim 26, in which the detector is connected to suitable indicator means to differentiate between a proper and improper pass.

28. A security system as defined in claim 26, in which said detector is provided with a characteristic eraser means, and appropriate means to make the eraser means operative only during withdrawal of the pass subsequent to presentation of the pass to the detector for inspection thereby.

29. A security system as defined in claim 26, in which the validator is provided with an indicator means made operative if a pass presented thereto is not magnetized by the validator.

30. A security system as defined in claim 26, in which said detector is provided with an electromagnetic eraser means, and appropriate electrical switch means to energize the electromagnetic eraser means to make the same operative only during withdrawal of the pass subsequent to presentation of the pass to the detector for inspection thereby.

31. A security system for protecting an enclosure having an exit and an entrance, said system comprising a pass card having a magnetic material adapted to be impressed magnetically with a normally retained but erasable code characteristic, a validator at an exit to magnetically impress the pass with a desired code characteristic for the next admittance, and a detector at an entrance to check whether the pass has the proper code characteristic, said detector being provided with an electromagnetic eraser means, and appropriate switch means to make the eraser means operative only during withdrawal of the pass subsequent to presentation of the pass to the detector for inspection thereby.

32. A security system for protecting an enclosure having an exit and an entrance, said system comprising a pass card having a material adapted to be impressed electronically with an invisible normally-retained but erasable code characteristic, a validator at an exit to impress the pass with a desired code characteristic for the next admittance, and a detector at an entrance to check whether the pass has the proper code characteristic, said detector being provided with a characteristic eraser means, and appropriate means to make the eraser means operative only during withdrawal of the pass subsequent to presentation of the pass to the detector for inspection thereby.

References Cited in the file of this patent

UNITED STATES PATENTS

| | | |
|---|---|---|
| 2,258,106 | Bryce | Oct. 7, 1941 |
| 2,333,463 | Bryce | Nov. 2, 1943 |
| 2,359,617 | Bryce | Oct. 3, 1944 |
| 2,566,017 | Cooley | Aug. 28, 1951 |
| 2,628,539 | Neergaard | Feb. 17, 1953 |
| 2,648,729 | Noregaard | Aug. 11, 1953 |
| 2,652,124 | Bocci | Sept. 15, 1953 |
| 2,689,279 | Noregaard | Sept. 14, 1954 |
| 2,712,572 | Roberts | July 5, 1955 |
| 2,714,201 | Whitehead | July 26, 1955 |
| 2,728,066 | Loewe | Dec. 20, 1955 |
| 2,754,496 | Embrey et al. | July 10, 1956 |